INVENTOR.
CARL C. ROECKS
KLAUS K. STANGE
BY
Arnold E. Renner

TRANSPORT DEVICE

Filed May 4, 1964 3 Sheets-Sheet 2

INVENTOR.
CARL C. ROECKS
BY KLAUS K. STANGE
Arnold E. Renner

July 19, 1966 C. C. ROECKS ET AL 3,261,523

TRANSPORT DEVICE

Filed May 4, 1964 3 Sheets-Sheet 3

INVENTOR.
CARL C. ROECKS
KLAUS K. STANGE

BY Arnold E. Renner 3,261,523

TRANSPORT DEVICE

Carl C. Roecks and Klaus K. Stange, both of Phoenix, Ariz., assignors to General Electric Company, a corporation of New York Filed May 4, 1964, Ser. No. 364,437
13 Claims. (Cl. 226—179)

The present invention relates generally to transport devices and more particularly to a mechanism for providing motion to an elongated member such as a tape.

In the computer field one commonly used storage medium is an elongated tape made of a flexible plastic material to which has been applied a coating of magnetic material. Such a medium is usually referred to as magnetic tape and this tape is moved past a read-write head for recording and reading-out data, usually in coded form. Perhaps the most prevalent means for providing movement to magnetic tape is by running the tape between a constantly rotating capstan having a frictional surface (e.g. rubber coated) and what is known in the art as a pinch roller which is mounted for free rotation upon a shaft which is selectively movable a small amount parallel to its axis toward and away from the axis of the capstan. In such a configuration, when it is desired to drive the tape, the pinch roller is moved toward the capstan, with a force sufficient to press the tape against the surface of the rotating capstan which then drives the tape. When it is desired to stop the tape, the mechanism which maintains the pinch roller in contact with the tape is released and the roller moves away from the tape with the result that the tape is no longer frictionally engaged with the rotating capstan. Two oppositely rotating capstans and pinch rollers are usually provided, one for driving or pulling the tape in one direction past the read-write head and the other for driving or pulling this tape in the reverse direction.

The most widely used mechanism for moving the pinch roller into engagement with the tape is a direct mechanical linkage connecting the roller to the armature of a simple solenoid assembly. While pinch rollers actuated in this manner have heretofore enjoyed general acceptance in the industry, due primarily to modest performance requirements and design standardization, they have several shortcomings for use in higher speed and increasingly higher performance tape handlers. Included among their shortcomings is the fact that such rollers often strike the tape and through it the rubber coated capstan with a force of such large magnitude that the roller bounces away from the tape. More specifically, the roller does not just bounce a single time but actually "jitters" before coming to rest to securely maintain the tape against the capstan. This "jittering" causes erratic tape acceleration resulting in undersirable wear and tear on the tape. The reason for this large force may be more fully understood by appreciating that the force with which a simple solenoid armature moves varies logarithmically with the distance between the armature and the solenoid coil. That is, as the armature approaches the end of its movement, the force and speed with which it is moving increases greatly. Inasmuch as the roller is coupled directly to the armature, this same force is applied to the roller.

Another disadvantage, in certain instances, of that type of device is directly related to the magnitude of the current which must be controlled to effect the operation of the solenoid. The pinch roller, in such an application, must provide a force which is sufficient to prevent slippage of the tape as the capstan rotates. The mechanism which operates the pinch roller must, therefore, be capable of providing this force. In the solenoid actuated type, this high degree of force necessary can only come, as a practical matter, through a relatively large current. To provide a solenoid and the necessary related switching circuitry which are capable of handling this large current is inherently very costly.

A further problem related to solenoid actuated pinch rollers is that of maintaining alignment. In any device of this nature it is a necessity that the surfaces of the roller and its capstan are held parallel within relatively close limits. Were this not done, the tape tends to "skew" and not proceed uniformly along its length. Even assuming that the roller is perfectly aligned, it is seen that variations in the capstan surface or variations in the tape itself will result in the same skewing effect.

A second type of roller actuator which overcomes the difficulty of the logarithmic force characteristic of a simple solenoid assembly is what is commonly referred to as the floating coil solenoid. While the floating coil solenoid has a linear force characteristic for a limited travel distance, physical size and tolerances place serious limits on this type solenoid. Additionally, such a device is more expensive than this simple solenoid design.

A third general type of tape drive mechanism is that which belongs to the vacuum or pressurized capstan category. In devices of this latter nature, a fluid pressure (either positive or vacuum) is utilized to maintain the tape in frictional engagement with a rotating capstan. While these devices are satisfactory from actual operation viewpoint they are relatively very expensive.

The present invention provides a pinch roller, for use with a rotating capstan, which eliminates the above described problems associated with prior art devices and, at the same time, greatly reduces the cost. This pinch roller is preferably of a light weight material such as nylon and may be further reduced in weight by being of a hollow cylindrical configuration. The roller quickly and gently effects the engagement of the tape with the capstan and is self-compensating for slight irregularities in the capstan, tape, roller, etc. These actions of the roller are achieved, in the present invention, by actuating and supporting the roller solely by the use of a pressurized fluid, thus alleviating the need for heavy, precision made, and expensive mechanical supports, bearings and driving mechanisms.

It is, therefore, an object to provide a pinch roller for use with a rotating tape drive capstan and air pressure actuating means for causing the pinch roller to positively but gently engage a tape with the drive capstan.

Still another object is to provide an inexpensive pinch roller mechanism which is self-compensating for irregularities in various elements of the total assembly including the tape itself.

It is a still further object of this invention to provide a device for use in tape handling apparatus which is low in cost, positive in its action, will eliminate critical alignment problems between a capstan and roller, and will eliminate much of the costly electronic circuitry of prior art electro-mechanical devices.

Further objects and advantages of the invention will become apparent as the following description proceeds and features of novelty which characterize the invention will be pointed out in particularity in the claims annexed to and forming a part of this specification. For a better understanding of the present invention, reference is made to the accompanying drawings in which:

Figures 2, 3:
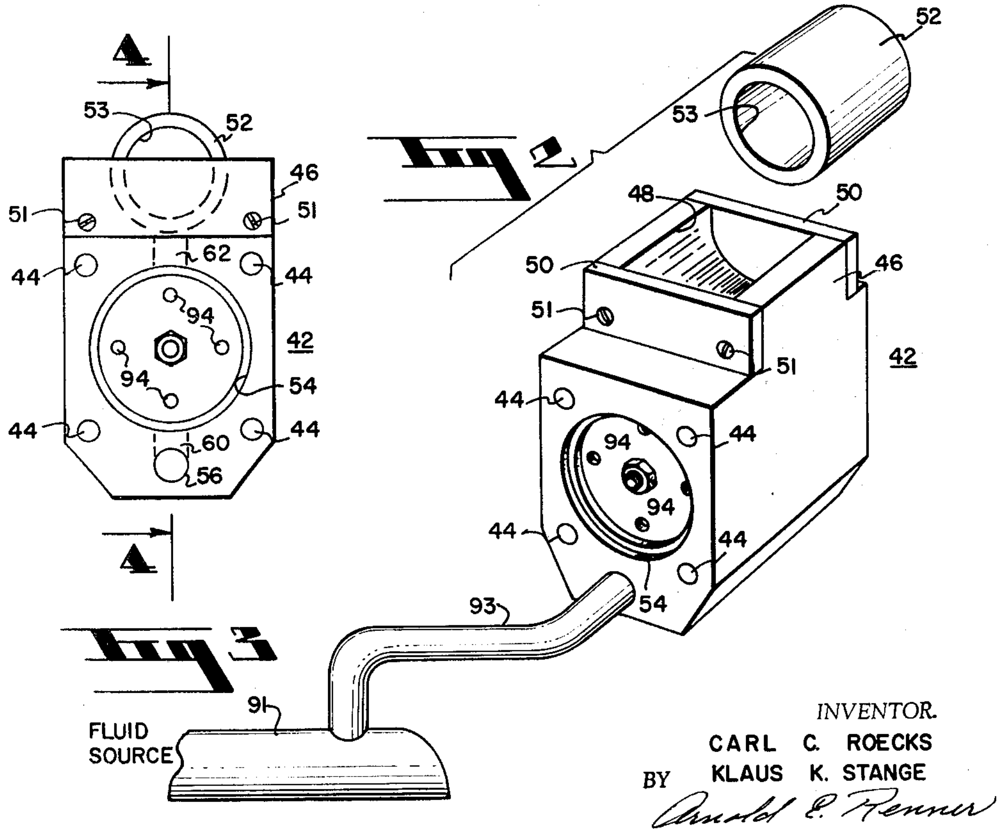
FIG. 2 is a perspective view of a first embodiment of a roller mechanism of the present invention in which the roller has been slightly elevated to expose the fluid cavity in which it normally rides.
FIG. 3 is a front view of the mechanism of FIG. 2 but having the roller positioned within the fluid cavity.
Figure 4:
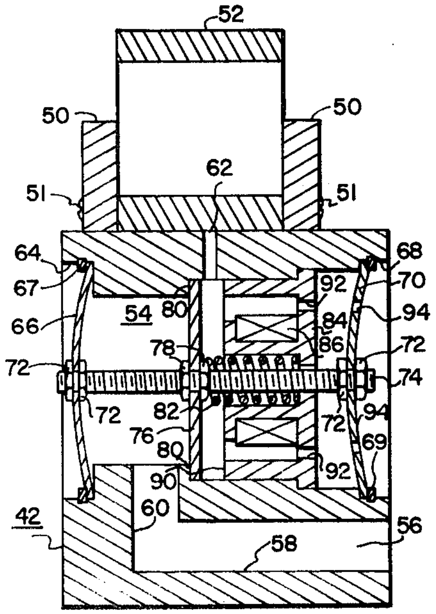
FIG. 4 is a sectional view of the device of FIGS. 2 and 3 taken along the line 4—4 of FIG. 3 and illustrating the valving arrangement for the mechanism of the present invention.
Figure 6:
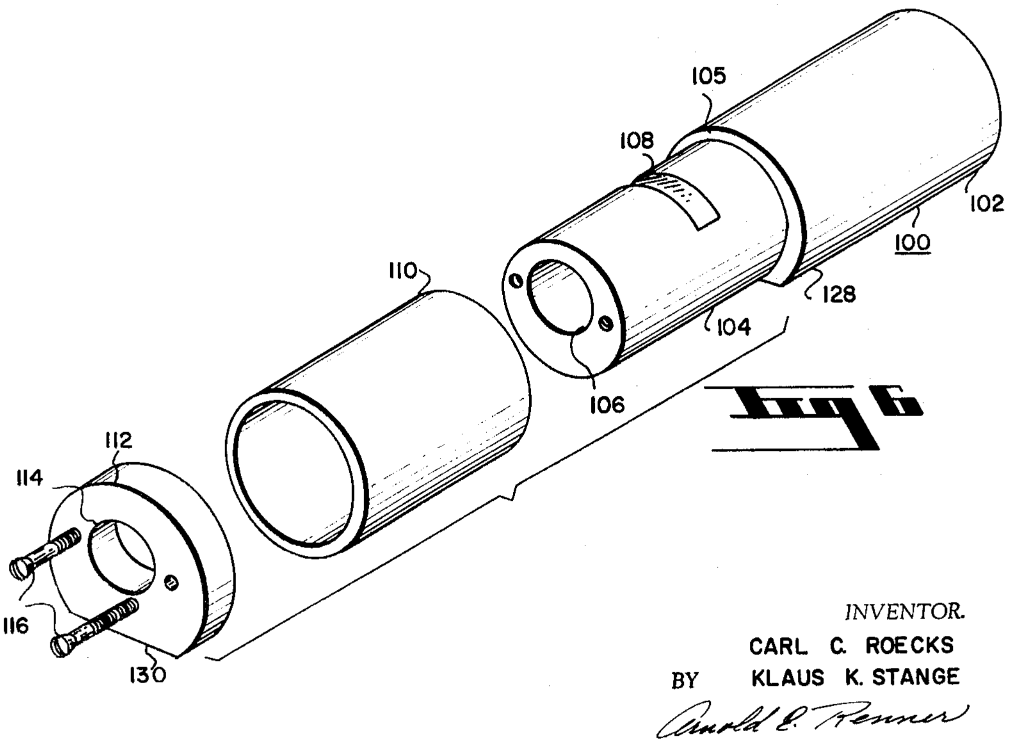
Figure 7:
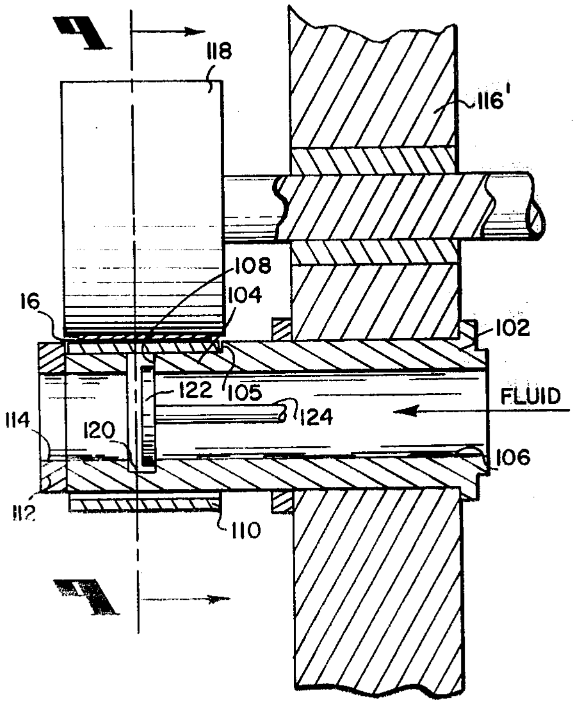
Figure 9:
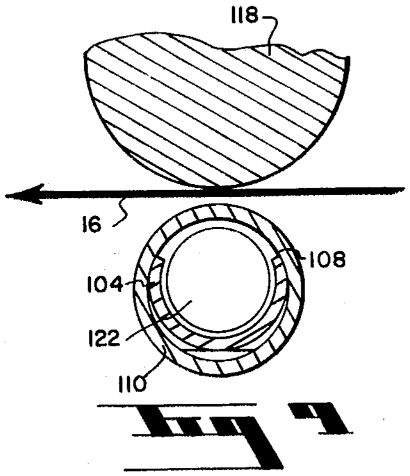
Figure 8:
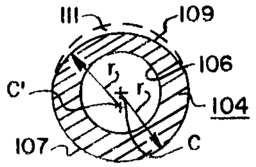
Figure 10:
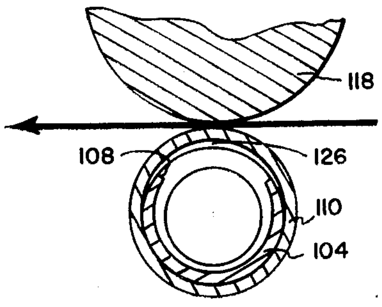

FIGS. *5a* and *5b* are fragmentary views, in cross section, showing the roller and its relationship with the fluid cavity of FIGS. 2, 3 and 4 in the unpressurized (FIG. *5a*) and pressurized (FIG. 5b) conditions;

FIG. 6 is an exploded perspective view of the present invention in a second embodiment;

FIG. 7 is a cross sectional view in side elevation illustrating the second embodiment of the present invention and its relationship with a driving capstan;

FIG. 8 is a view illustrating, through exaggeration, the left end configuration of the largest element of FIG. 6;

FIG. 9 is a cross sectional view taken along line 9—9 of FIG. 7; and,

FIG. 10 is a cross sectional view, similar to that of FIG. 9, but showing the roller of the present invention maintaining the tape in engagement with the driving capstan.

Figure 1:
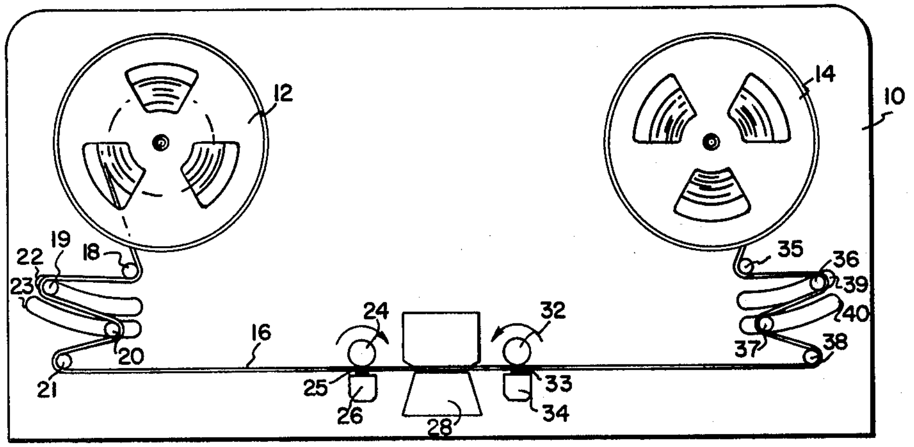
FIG. 1 is a view in front elevation of a tape transport panel showing the relationship between the tape storage means and the tape driving mechanism.

With reference now to FIG. 1 there is illustrated an apparatus such as might utilize the mechanism of the present invention. As shown, there is provided a panel 10 upon which the remaining components of the apparatus are mounted. Positioned on the panel 10 are two storage means 12 and 14 which are shown to be in the form of reels. Disposed upon the reels 12 and 14 is a quantity of storage medium 16 in the form of an elongated tape which passes from one reel to the other in either direction. In so passing, the tape 16 is wound over a plurality of rollers 18 through 21. Rollers 18 and 21 are each mounted on a stationary stud or other suitable axle while the rollers 19 and 20 are mounted on studs which are movable within a pair of slots 22 and 23 and spring urged against the tape. The purpose of the rollers is for the buffering of shock and tape vibration particularly during the starting and stopping of the tape all such as is well known in the art. From the roller 21 the tape 16 passes through a left drive assembly comprising a capstan 24 and a pinch roller assembly 26, thence to a transducer 28, through a right drive assembly including a capstan 32 and a pinch roller assembly 34, and onto a second grouping of rollers 35 through 38 having associated slots 39 and 40. The essential design and function of this latter grouping of rollers and slots is the same as that described with respect to those positioned near reel 12.

It is the purpose of the above described apparatus to move the tape over the transducer 28 in order that information may be written on or read from the tape 16. In order that this information transfer may be properly accomplished, the tape must pass over the transducer 28 at a uniform rate of speed regardless of the direction in which it is going. This rate of speed is relatively high and the direction of movement is often reversed quite rapidly. To this end, the two capstans 24 and 32 are normally rotated at constant speed in opposite directions. As shown by the arrows, capstan 24 is rotated in the clockwise direction while capstan 32 is rotated in the counterclockwise directions. The capstans 24 and 32, as well as the reels 12 and 14, are given rotary motion through suitable motor drive means which have not been shown but which may be any of those well known in the art. When it is desired to move the tape toward the right from reel 12, past the read-write head 28, to reel 14, a pinch roller 33 associated with the assembly 34 is actuated so as to exert an upward force against the tape to thereby move and hold the tape in frictional driving engagement with the rotating capstan 32. Movement of the tape toward the left from reel 14 to reel 12 is effected in a similar manner utilizing the rotating capstan 24 and its associated roller assembly 26, including a pinch roller 25.

The foregoing discussion has been for the purpose of providing a suitable environment for the roller assembly of the present invention and is intended to be illustrative only and not by way of limitation. It will become obvious as the description proceeds that the roller assembly of the present invention may be utilized in a great number of different environments with equal applicability.

In general, the pinch roller assembly of the present invention includes a roller whose weight may be kept to a minimum by making it of a material such as nylon but could be made of a metal such as aluminum or even steel. Further weight reduction may be achieved by making the roller of a hollow cylindrical configuration. This roller serves as a movable wall of a fluid chamber. Under the action of a pressurized fluid applied to the chamber, the roller is moved to quickly but gently, without bounce or "jitter," press the tape against the rotating capstan with sufficient force to provide ample acceleration and movement of the tape.

The remaining parts of the chamber, of which the roller forms the movable wall, are preferably made slightly oversized with respect to the roller so that a small amount of fluid leakage is present around the roller. This particular configuration provides several advantages including the fact that the roller in the actuated condition is solely supported by the pressurized fluid and is free to rotate on a very low friction fluid bearing. Because the roller is light weight and relatively friction free, tape wear is slight. Additionally, the need for the expensive precision bearings and mechanical supporting structures of prior art pinch rollers is eliminated. In view of the fact that fluid leakage around the roller is a desirable feature, it is readily seen that manufacturing tolerances may be fairly liberal resulting in a more economically produced device. This configuration also permits the roller to yield slightly in any direction so that it is free to compensate for slight irregularities in the capstan, tape, roller, or other components of the assembly.

Referring again to the drawings, FIGS. 2, 3, and 4 illustrate a first embodiment of the present invention for use in an environment such as shown in FIG. 1. The pinch roller assembly includes a housing or body 42 (FIG. 2) having four holes 44 extending the depth thereof to facilitate the mounting of the body 42 on the panel 10. Positioned atop the body 42 is a substantially U-shaped fluid cavity 48 which may be formed in any suitable manner, for example, by forming a U-shaped groove in the body 42 and affixing suitable plates 50 over the open ends of the groove.

The roller 52 which is disposed within the cavity 48 may be made of any material having good dimensional stability with respect to temperature and humidity and experience has shown that certain plastics, for example nylon, serve very satisfactorily for this purpose. Plastics have several advantages over other materials, such as metals, for use as rollers. Plastic rollers are generally lighter in weight and do not require lubrication as would a metal roller. Additionally it has been found that a roller made of a material such as nylon causes less wear to the cavity 48 and to the tape which it serves to drive. The illustrated roller 52 is in the form of a hollow cylinder. An opening 53, in this embodiment, serves no purpose other than that of reducing the total mass of the roller and from this standpoint should be as large as possible. However, to insure proper roller function, the wall should be of sufficient thickness to prevent substantial roller deformation when it presses the tape against the capstan and also to prevent a large amount of skewing of the roller within the cavity 48. By way of example, actual machines made in accordance with the present invention have shown that a nylon roller having an outside diameter of ¾ inch and a wall thickness of ⅛ inch performs very satisfactorily.

Figure 5A:
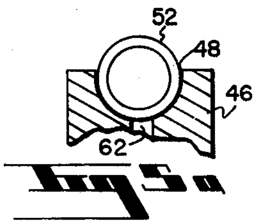
Figure 5B:
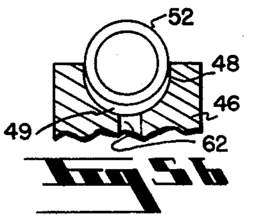

The cavity 48 and the roller 52 are dimensioned so as to substantially mate with one another and together define a fluid chamber 49 (FIG. 5*b*). While tolerances are not particularly critical in the device of the present invention, in order that the roller 52 be free running it is desirable that the cavity 48 be slightly larger than the roller 52. In practice, it has been found that a cavity approximately two thousandths of an inch larger than the roller performs well for the roller of the material and size given. This variation in dimension between the cavity and the roller is sufficient to permit the existence of a fluid bearing between the cavity walls and the roller and to permit the roller to be free running. A further advantage of this construction which may not be readily apparent resides in the fact that this small amount of variation in size permits the roller to skew itself slightly in any direction so that the mechanism becomes self-compensating for minor irregularities in the roller, tape, or capstans.

The height of the cavity 48, measured at its maximum vertical dimension, is preferably slightly greater than one-half the outer radius of the roller 52. This permits the requisite vertical motion of the roller, as will be explained in greater detail later while yet retaining the proper roller position.

A bore 54 (FIG. 4) is provided in the main portion of the body 42 for housing a suitable selectively operable valving mechanism for controlling the admission of an actuating fluid to the chamber 49 (FIG. 5*b*). While the details of the valve mechanism do not form a part of the present invention, FIG. 4 does generally illustrate one possible form of a valve which may be utilized for this purpose. As is shown in this figure, the actuating fluid, which, for the sake of convenience shall hereinafter be referred to as air, enters the body 42 by way of an aperture 56 located in a lower part of the body. The air passes through a longitudinally extending passageway 58 and thence to a vertical passageway 60 into the bore 54. An additional fluid passageway 62 is provided between the bore 54 and the chamber 49 to provide a means whereby air may be admitted to that chamber.

Within a suitable recess 64 on the left side of the body 42 as viewed in FIG. 4, there is provided a flexible diaphragm 66 which is held in place by a suitable means such as a retaining ring 67. At the opposite side of the body 42 there is provided a second recess 68 into which is placed a second flexible diaphragm 70 similarly retained in position by a ring 69. A threaded shaft 74 extends between and is secured, by fastening means such as nuts 72, to the two diaphragms 66 and 70. A valve member 76 is positioned intermediate the two diaphragms 66 and 70 and may be in the form of a disc which is secured to the shaft 74 by a pair of nuts 78.

In FIG. 4, the valve assembly is shown in its closed position, that is, air is not being admitted to the cavity 48. As such, the valve disc 76 is shown to be seated against a peripheral flange 80 located within the bore 54 to the left of passageway 62. The valve disc 76 is retained in this position under the action of a compression spring 82. The actuating means of the valve asembly is of the solenoid type and includes a magnetizable core 84 around which has been placed a solenoid coil 86. By making the valve disc 76 of a magnetic material, it may also serve as a solenoid armature during the operation of the valve mechanism.

When it is desired to admit air to the chamber 49, coil 86 is actuated by suitable energizing current and the magnetic forces generated attract disc 76 to the core 84. With the valve disc 76 thus attracted to the core 84 the disc seats against a second peripheral flange 90 at the right of the fluid passageway 62 and opens the valve. The air is then allowed to flow from a suitable source (FIG. 2) via a conduit 93, aperture 56, passageways 58 and 60, bore 54, and from there through the passageway 62 into the chamber 49. This air under pressure acts upon that portion of the outer surface of the roller 52 disposed within the cavity 48 to cause the roller to be lifted from the rest position within the cavity 48. This movement of the roller 52 forces the tape 16 into frictional contact with the capstan associated with that particular roller.

That portion of the outer surface of the roller 52 resting within the cavity 48 serves as the moving wall and cooperates with the cavity 48 to form the air chamber 49 (FIG. 5*b*). The pressurized air, when admitted to the chamber, acts upon the roller and moves the roller in the vertical direction. Movement of the roller in other than the vertical direction is restrained by the walls of the cavity 48.

As briefly stated earlier, the relationships existing between the roller and the cavity in the unpressurized and pressurized conditions are illustrated respectively in FIGS. 5*a* and 5*b*. The FIG. 5*b* illustration is somewhat exaggerated in that in practice the roller moves only about 6 to 8 mils in the vertical direction. By locating the roller in close proximity to a rotating capstan, such as is illustrated in FIG. 1, the aforementioned vertical movement of the roller 52 presses the tape into frictional engagement with the capstan to provide the required acceleration and movement of the tape.

The action of the pinch roller of the instant invention is quite different from those rollers of the prior art which strike the capstan with a force so great as to produce bounce and "jitter." Upon the opening of the valve, air will begin to flow into the cavity and build up pressure under the roller which is at rest in the cavity. As soon as the air pressure reaches a sufficient value, the roller will begin to move upwardly in the cavity with a resultant increase in the volume of the chamber 49. So long as the roller is free to move, the pressure within the chamber will remain substantially constant and the roller will move at a substantially constant rate. However, when the roller contacts the tape, it imposes additional resistance to the roller movement, and the pressure within the chamber begins to increase. Further movement of the roller forces the tape into engagement with the capstan resulting in stopping the upward movement of the roller and hence a cessation of increasing chamber volume. With a constant chamber volume, the pressure within the chamber will build up to its maximum value thus increasing the force with which the roller presses the tape against the capstan. Thus, the pinch roller of the instant invention does not "slam" the tape against the capstan but instead seats the tape against the capstan and then increases the force with which the tape is so held. Any tendency of the roller to bounce is automatically damped by a cushion effect of the pressurized air within the chamber 49.

While it might seem from the foregoing description of roller action that the response time of the device is fairly slow, such is not the case. The tape handler built in accordance with the present invention utilized a nylon roller of ¾ inch outer diameter, ½ inch inner diameter, and ⅝ inch length. An air pressure of approximately 10 pounds per square inch was supplied to the fluid chamber. The roller was moved through a total distance of approximately eight mils which is more than adequate to provide proper tape control. Response time was measured from the initiation of the control signal until such time as the tape speed steadied to $\pm 5\%$ of terminal velocity. The response time of the tape handler having the above parameters was approximately 1½ milliseconds. By comparison, response times of representative solenoid pinch rollers are in the range of from 3 to 5 milliseconds. Several factors contribute to the faster response time of the present invention. The alleviation of roller "jitter" is definitely a large factor. The low inertia roller supported by a very low friction air bearing also adds materially to the improved performance of the instant invention.

As well as providing a low friction bearing for the roller, the air in cooperation with the slightly oversized cavity permits a slight amount of roller skewing while the tape is being driven. This skewing may result from and compensate for slight irregularities in the capstan or roller surfaces, variations in tape thickness, or from a slight misalignment of some component of the tape drive.

When it is desired to stop driving the tape, the power is removed from the solenoid coil 86 (FIG. 4) allowing the disc 76 to return to its left-hand position under the action of spring 82 and close the valve. Chamber 49 is now vented to atmosphere via passageway 62 and apertures 92 and 94 located respectively within the solenoid core 84 and the diaphragm 70. Thus pressure within the chamber 49 is relieved and the roller is free to return to its rest position in cavity 48 under the force of gravity.

It is worthy of note that the particular valve arrangement shown in FIG. 4 necessitates neither a strong spring 82 nor a solenoid assembly 84–86 capable of large forces. In either the closed or open valve positions, air under pressure acts with approximately equal force on both the diaphragm 66 and the valve member 76. Because both of these members are attached to the same shaft, the forces exerted on these two members tend to cancel one another. Thus, only small force by the spring or the solenoid are necessary to effect positive action of the valve. Furthermore, the valve disc need be moved only a short distance between its two positions; therefore, the valve assembly operates with an extremely fast reaction time.

With reference now to FIGS. 6 through 10 there is shown a roller assembly of the present invention in a second embodiment. This embodiment includes a body member 100 having an enlarged portion 102 and a reduced portion 104 to thereby form a shoulder 105 between them. The member 100 may be made from a piece of bar stock of any suitable material such as bronze. While the reduced portion 104, in cross section, may be any of a variety of configurations, that illustrated is quasi-elliptical and may be fabricated by performing two turning operations utilizing the same radius but different centers. FIG. 8 illustrates this method of forming the portion 104. The first turning operation is made on the bar stock using center C and a radius $r$ to form a surface represented by the arc 107 and the phantom-line arc. The second turning operation is made using center C′, slightly displaced from center C, and the same radius $r$ to form a surface represented by arc 109, thus removing material in region 111 between the phantom-line arc and the arc 109. The region 111 serves as a fluid chamber when a cylindrical roller is placed over the reduced portion 104 as will be more fully understod as this description proceeds. As previously stated, other configurations than that illustrated could be used, it being necessary only that the portion 104 be of a configuration which provides, when empolying a roller 110, a suitable fluid chamber for the actuation of that roller.

Positioned around the reduced portion 104 is a hollow cylindrical roller 110 which may be substantially identical to that described with respect to the previous embodiment. The inner radius of the roller 110 is approximately the same as that which was utilized to form the portion 104; being oversized only an amount sufficient to permit the roller to be free running on that portion. A flange member 112, having an aperture 114, cooperates with the shoulder 105 to form thrust bearing surfaces to limit the longitudinal motion of the roller 110. The flange member 112 may be retained in place by securing that member to the portion 104 by suitable fasteners, for example a pair of screws 116 (FIG. 6).

A bore 106, which serves as a fluid passageway, extends the length of the member 100. Bore 106 is connected to a suitable source of fluid pressure which, for the sake of simplicity, has not here been shown but is represented by the arrow in FIG. 7. A slot 108 (FIG. 6) in the reduced portion 104 provides an air passage between the bore 106 and the roller 110.

A support member 116′ (FIG. 7), which may be the panel 10 of FIG. 1, is provided as a support for a driving means 118, e.g. a rotating capstan such as those designated by reference characters 24 and 32 in FIG. 1. The support member 116′ also serves as a support for the roller mechanism of the present embodiment which is positioned in an operative relationship with the capstan 118. As in the previous embodiment, an elongated tape 16 is positioned between the capstan 118 and the roller 110.

As previously stated, the bore 106 serves as a fluid passageway. It also serves to house the valving mechanism of the present embodiment. To this end, there is provided an interior recess 120 which is in alignment with the slot 108. This recess is formed peripherally around the bore 106 and serves to form two valve seats upon which a disc or valving member 122 seats to control a fluid which activates the roller 110. The disc 122 is connected by a shaft 124 to a suitable actuating means, which has not been shown but which, for example, may be an assembly similar to that illustrated with respect to the earlier embodiment.

In the inactivated state, when the roller 110 is not maintaining the tape 16 in frictional engagement with the capstan 118, disc 122 is maintained in the position illustrated in FIG. 7, so that even though a fluid under pressure is applied to the bore 106 it is blocked by the closed valve. In this condition, the roller 110 rests on the upper region of the portion 104 and does not engage the tape 16 with the capstan. This rest position of the roller is illustrated in FIGS. 7 and 9. It is noted (FIG. 7) that in this condition the inside of the roller and its valve chamber formed by slot 108 is at atmospheric pressure.

When it is desired to effect the frictional engagement of the tape 16 with the capstan, disc 122 is moved to the left in recess 120. The fluid under pressure is now admitted through the bore 106 and the slot 108 to the inner surface of the roller 110. This fluid will force the roller radially upward to thereby press the tape against the rotating capstan as described with respect to the previous embodiment. It may be seen that when the roller is so moved from its rest position shown in FIG. 9 to its tape drive position shown in FIG. 10, a fluid chamber designated 126 is formed by such movement and is subjected to the input air pressure. As before, slight tolerances between cooperating parts allow the roller to skew slightly to compensate for irregularities in the capstan, tape, roller, etc. and to establish a suitable air bearing for the roller.

By providing flattened areas 128 and 130 (FIG. 6) on the body portion 102 and flange 112 respectively, it may be assured that no chamber capable of maintaining a positive fluid pressure can be established at the lower region of the portion 104 but that this region will always remain at atmospheric pressure. Thus the necessary pressure differential on the roller 110 is established.

When it is desired to terminate the tape movement, the disc 122 is moved once again to the right-hand position illustrated in FIG. 7. The fluid chamber 126 is now vented to atmosphere as was previously described, and the roller will rapidly fall to its rest position.

There has been shown and described a fluid actuated pinch roller which alleviates the primary objections to pinch rollers known in the art. Because the roller is fluid operated, the larger electrical currents associated with solenoid operated and maintained rollers are unnecessary. The small amount of electrical current necessary for a movement of the valve arrangement to control the operating fluid requires circuitry considerably less expensive than that necessary for the prior art pinch rollers. The present invention also provides for the compensation of slight irregularities in parts and alignment. Most importantly, however, the present invention provides an economical pinch roller assembly which is less wearing on the tape and which operates faster and with less bounce and "jitter" than those pinch rollers previously used in the art.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A transport system for imparting motion to an elongated storage medium comprising, a driving member and means operable to maintain said storage medium in frictional engagement with said driving member, said means comprising a roller capable of rotary movement and displacement in a radial direction for frictionally engaging said storage medium with said driving member, a fluid chamber, and control means for applying fluid under pressure to said fluid chamber, said fluid under pressure effecting said displacement and providing a fluid bearing for said roller during said rotary movement.

2. A transport system for imparting motion to a storage medium comprising, a driving member and means operable to maintain said storage medium in frictional engagement with said driving member, said means comprising a fluid chamber, a roller capable of displacement in a radial direction positioned in said chamber, and means for applying a fluid under pressure to said chamber and to a surface of said roller to effect a displacement of said roller to thereby frictionally engage said storage medium with said driving member.

3. A tape driving mechanism for imparting motion to an elongated tape comprising, a driving member, a pinch roller capable of rotary motion about its axis and displacement in a radial direction to thereby force said tape into engagement with said driving member, and selectively operable control means for applying a pressurized fluid to an outside surface of said roller to effect said displacement.

4. A tape transport system for imparting longitudinal motion to an elongated tape comprising, a driving member and a roller mechanism operable to maintain said tape in frictional engagement with said driving member, said mechanism comprising means including a roller defining a fluid chamber, and selectively operable means for applying a fluid under pressure to said chamber, said fluid under pressure acting on said roller to force said roller into engagement with said tape, said roller being of sufficient thickness to prevent substantial roller deformation by said fluid under pressure.

5. A tape transport system for supplying tape with motion along the length thereof comprising a rotating capstan and means operative to maintain said tape in frictional engagement with said capstan, said means comprising a body member including a substantially U-shaped cavity, a cylindrical member positioned in said cavity to form a fluid chamber therewith, and control means for applying fluid under pressure to said fluid chamber, said fluid under pressure acting on that portion of said cylindrical member disposed within said cavity to force said cylindrical member into engagement with said tape.

6. A tape transport system for imparting motion to an elongated tape comprising, a rotating driving capstan and a tape engaging mechanism operative to effect the frictional engagement of said tape with said capstan, said mechanism composed of housing walls defining a substantially arcuate cavity, a movable pinch roller positioned in and substantially mating with said cavity and means in communication with said cavity for the application thereto of a fluid under pressure, said fluid under pressure serving to move said pinch roller to effect the engagement of said tape with said capstan.

7. A transport system for imparting motion to an elongated tape comprising: first and second tape storage means and first and second tape driving mechanisms for selectively imparting motion to said tape in either of said two directions between said first and second tape storage means; the first of said tape driving mechanisms comprising a driving capstan rotating in a clockwise direction and a pinch roller assembly operable to frictionally engage said tape with said driving capstan to thereby move said tape in the first of said directions; the second of said tape driving mechanisms comprising a driving capstan rotating in a counterclockwise direction and a pinch roller assembly operable to frictionally engage said tape with said driving capstan to thereby move said tape in the second of said directions; each of said pinch roller assemblies comprising a fluid chamber, a roller capable of displacement in a radial direction positioned in said chamber, and control means for applying pressurized fluid to said chamber to effect said displacement of said roller to thereby engage said tape with a selected one of said driving capstans.

8. A system for writing information onto or reading information from an elongated tape comprising: two tape storage means having said tape extending in a path between said storage means; a transducer for writing information onto or reading information from said tape, said transducer located along said path and adjacent said tape; first and second selectively operable tape driving mechanisms for moving said tape selectively in either direction past said transducer, said first tape driving mechanism including a first capstan rotating in a first direction and said second tape driving mechanism including a second capstan rotating in a direction opposite to that of said first capstan, each of said tape driving mechanisms also including first and second pinch roller assemblies, respectively constituting a part of said first and second tape driving mechanisms, for selectively effecting the engagement of said tape with the respective capstan to thereby impart motion to said tape; said first and second pinch roller assemblies comprising a fluid chamber, a roller capable of rotary movement and displacement in a radial direction for frictionally engaging said storage medium with said driving mechanism and control means for applying a pressurized fluid to said chamber to effect a displacement of said roller to thereby engage said tape with said capstan, said fluid under pressure effecting said displacement and providing a fluid bearing for said roller during said rotary movement.

9. A pinch roller mechanism for effecting frictional engagement between an elongated tape and a rotating capstan comprising, a housing including a fluid cavity, said cavity being substantially U-shaped, a roller disposed within said cavity and extending thereabove, means for supplying pressurized fluid to said cavity whereby said roller is moved under the force of said pressurized fluid into contact with said tape to thereby force said tape into frictional engagement with said rotating capstan.

10. A pinch roller mechanism for effecting frictional engagement between an elongated tape and a rotating capstan comprising, a housing including a substantially U-shaped pneumatic cavity, a cylindrical roller, capable of axial displacement, disposed within said cavity and extending thereabove an amount not more than one-half the outer diameter of said roller, means for supplying air to said cavity under a positive pressure whereby upon the applicaiton of said air to said cavity, said roller is axially displaced to force said tape into frictional engagement wtih said rotating capstan.

11. A pinch roller mechanism for effecting frictional engagement between an elongated tape and a rotating driving member, said pinch roller mechanism comprising, a body member, a hollow cylindrical roller being free to rotate about said body member, said body member and said cylindrical roller cooperatively forming a fluid chamber, and means for supplying a fluid under pressure to said chamber whereby under the force of said fluid said frictional engagement is achieved.

12. A pinch roller mechanism for effecting frictional engagement between an elongated tape and a rotating driving capstan, said pinch roller mechanism comprising, a hollow cylindrical roller, a body member disposed within said roller and forming a fluid chamber therewith, said roller and said body member dimensioned to permit both rotational and radial motion of said roller relative to said body member, and means for supplying a fluid under pressure to said chamber to accomplish a radial motion of said roller to thereby effect said frictional engagement.

13. A pinch roller mechanism for effecting frictional engagement between an elongated tape and a rotating driving capstan comprising, a hollow cylindrical roller, a substantially elliptical body member positioned within said roller, said body member having its maximum cross sectional dimension substantially the same as the inner diameter of said roller, said roller being free to rotate about and to move radially relative to said body member, means including said body member and said roller forming a fluid chamber, and means for supplying fluid under pressure to said chamber whereby said roller is moved radially with respect to said body member to effect said frictional engagement.

References Cited by the Examiner

UNITED STATES PATENTS

| | | | |
|---|---|---|---|
| 2,679,800 | 6/1954 | Lofquist | 226—194 X |
| 3,103,388 | 9/1963 | Cole | 302—31 |
| 3,134,528 | 5/1964 | Dickey | 226—97 |

OTHER REFERENCES

German printed application, 26,081, August 1956, Janssen.

M. HENSON, WOOD, Jr., *Primary Examiner.*

J. ERLICH, *Assistant Examiner.*